United States Patent
Himmeroeder

[19]

[11] Patent Number: 5,878,493
[45] Date of Patent: Mar. 9, 1999

[54] METHOD OF FORMING TOOTHED WHEELS

[75] Inventor: Helge Himmeroeder, Barrie, Canada

[73] Assignee: Tesma International Inc., Concord, Canada

[21] Appl. No.: 917,828

[22] Filed: Aug. 27, 1997

Related U.S. Application Data

[60] Provisional application No. 60/024,496, Aug. 28, 1996.

[51] Int. Cl. [6] .............................. B23P 15/14; B23P 17/00
[52] U.S. Cl. ..................................... 29/893.35; 29/893.33; 29/893.36
[58] Field of Search .............................. 29/893.3, 893.32, 29/893.33, 893.34, 893.35, 893.36; 72/68; 474/449, 457, 460

[56] References Cited

U.S. PATENT DOCUMENTS

| | | |
|---|---|---|
| 4,334,810 | 6/1982 | Behnke et al. . |
| 5,152,061 | 10/1992 | Himmeroeder ........................ 29/893.32 |
| 5,203,223 | 4/1993 | Himmeroeder ............................ 74/449 |
| 5,237,744 | 8/1993 | Himmeroeder ........................ 29/893.32 |
| 5,404,640 | 4/1995 | Himmeroeder ........................ 29/893.32 |
| 5,562,785 | 10/1996 | Yamanaka ............................... 29/893.3 |

FOREIGN PATENT DOCUMENTS

| | | |
|---|---|---|
| 2179225 | 12/1996 | Canada . |
| 0 493 792 A1 | 7/1992 | European Pat. Off. . |
| 0 764 482 A1 | 3/1997 | European Pat. Off. . |
| 2 524 354 A | 10/1983 | France . |
| 494 898 C | 3/1930 | Germany . |
| 196 25 893 | 1/1997 | Germany . |
| 08108323 | 4/1996 | Japan . |
| WO96/22847 | 8/1996 | WIPO . |

OTHER PUBLICATIONS

D. Townsend: "Dudley's Gear Handbook" 1992, McGraw–Hill, New York, US, XP002050419, 2nd edition, chapter 22, Figure 22.4.

*Primary Examiner*—P. W. Echols
*Attorney, Agent, or Firm*—Pillsbury Madison & Sutro, LLP

[57] ABSTRACT

A method for forming a toothed wheel which comprises the steps of providing a circular sheet metal blank of uniform thickness, cold forming an outer peripheral portion thereof into a thickened rim of uniform generally rectangular cross-sectioned configuration having (1) an outer periphery which does not exceed the outer periphery of the toothed wheel to be formed by more than approximately two percent (2) a radial thickness at least 2.0 mm greater than the tooth height of the toothed wheel to be formed, and (3) an axial thickness at least twice the uniform thickness of said blank, the cold forming comprising progressively moving a predetermined marginal peripheral portion of the metal blank having a cross sectional outline radially inwardly and axially outwardly while the integral integrity of the metal within the cross sectional outline is maintained without merging portions of the cross sectional outline together, and cutting a series of teeth in the periphery of the thickened rim by a hobbing operation.

14 Claims, 5 Drawing Sheets

METHOD OF FORMING TOOTHED WHEELS

This is a provisional application Ser. No. 60/024,496 filed Aug. 28, 1996.

This invention relates to the making of toothed wheels and more particularly to the making of toothed wheels from a circular blank of sheet metal of generally uniform thickness.

The type of toothed wheel herein contemplated is the type utilized in motor vehicles, as, for example, in the starter assembly for the motor of such vehicles. Specifically, the present subject matter contemplates the making of toothed wheels of the type disclosed in U.S. Pat. Nos. 5,152,061, 5,203,223, 5,237,744 and 5,404,640, the disclosures of each of which are hereby incorporated by reference each in its entirety.

Each of the above patents discloses a method of making toothed wheels from a circular blank of sheet metal of generally uniform thickness. In each case, the method comprises essentially two main steps: (1) the cold forming of a thickened outer rim on the blank and (2) the cold forming of a series of teeth in the thickened rim. In each instance, the step of cold forming the thickened rim is accomplished in multiple stages or steps. In many of the thickening stages or steps disclosed, the outer peripheral portion of the circular sheet metal blank is initially doubled onto itself and thereafter agglomerated into an integral thickened portion in such a way that an interface may occur in the thickened rim in an area which is of no consequence after the final cold forming of the teeth is accomplished.

In U.S. Pat. No. 5,404,640, there is an indication that, where the teeth are totally cold formed, tight tolerances are difficult to achieve so that in uses where dimensional precision of the teeth is required a final cutting step is provided after the cold forming of the teeth is completed. In the disclosed method, after forming the thickened rim, a series of initially formed teeth is cold formed by rolling contact with the tooth forming periphery of the tooth forming tool unit. Each of the initially formed teeth has a crest portion, a trough portion and a pair of oppositely disposed operative surfaces defined between the crest portion and the trough portion. The final step is to form the series of integral teeth by removing material from the pair of operative surfaces.

It has been found that, in those uses where the accuracy of a final cutting step is desired, it is feasible and cost effective to eliminate the initial cold forming of the teeth and form the teeth by a conventional hobbing procedure provided that (1) the cold forming of the thickened rim is accomplished in accordance with the principles of the present invention wherein a predetermined marginal peripheral portion of the metal blank has its cross-sectional outline progressively moved radially inwardly and axially outwardly while the integral integrity of the metal within the cross-sectional outline is maintained without merging portions of the cross-sectional outline together and (2) the predetermined marginal portion of the metal blank contains an amount of metal sufficient to form a thickened annular rim of uniform generally rectangular cross-sectional configuration having (a) an outer periphery which does not exceed the outer periphery of the tooth wheel to be formed by more than approximately 2% (two per cent), (b) a radial thickness at least 2.0 mm (two millimeters) greater than the tooth height of the toothed wheel to be formed and (c) an axial thickness at least 2 times the uniform thickness of the blank.

Accordingly, it is an object of the present invention to provide a method of forming a toothed wheel by providing a circular sheet metal blank of uniform thickness and cold forming an outer peripheral portion thereof into a thickened rim of generally rectangular shape in cross section having (1) an outer periphery which does not exceed the outer periphery of the toothed wheel to be formed by more than approximately two percent (2) a radial thickness at least 2.0 mm greater than the tooth height of the toothed wheel to be formed and (3) an axial thickness at least 2 times the uniform thickness of the blank and then cold forming the same by progressively moving a predetermined marginal peripheral portion of the metal blank radially inwardly and axially outwardly while the integral integrity of the metal within a cross sectional outline of the peripheral portion is maintained without merging portions of the cross sectional outline together. The toothed wheel is then formed by cutting a series of teeth in the periphery of the thickened rim by a hobbing operation.

IN THE DRAWINGS

Figure 2:
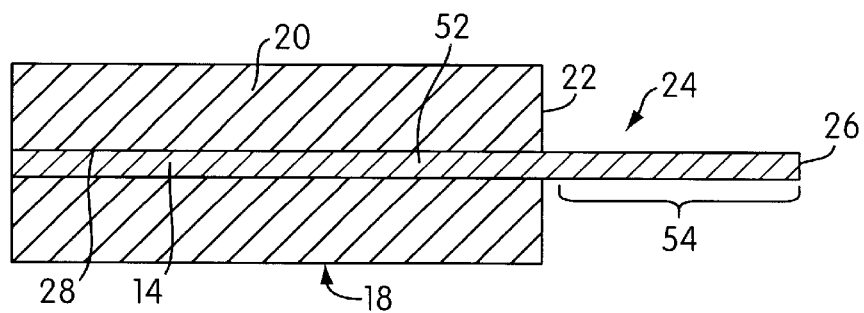
FIG. 2 is a fragmentary sectional view of one-half of a circular piece of sheet metal, which constitutes the preferred starting material in practicing the principles of the present invention, secured within a first rotary holding unit, also shown in fragmentary sectional view.
Figure 3:
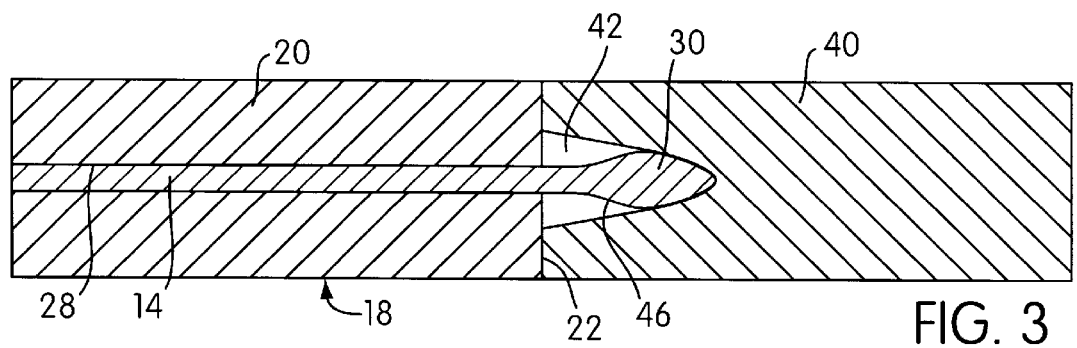
Figure 4:
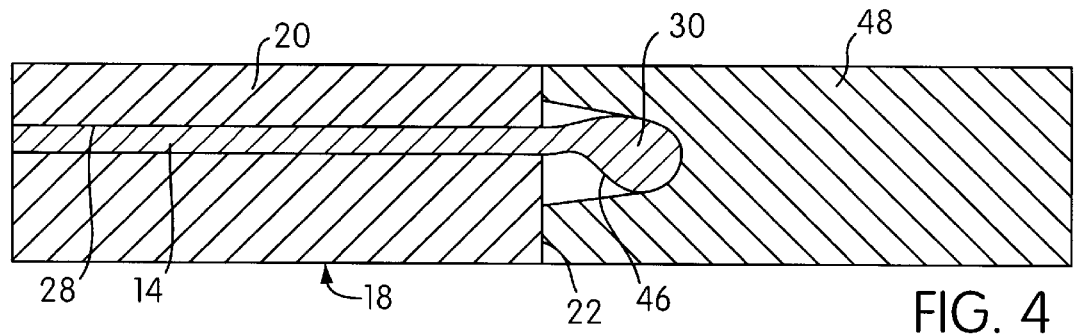
Figure 5:
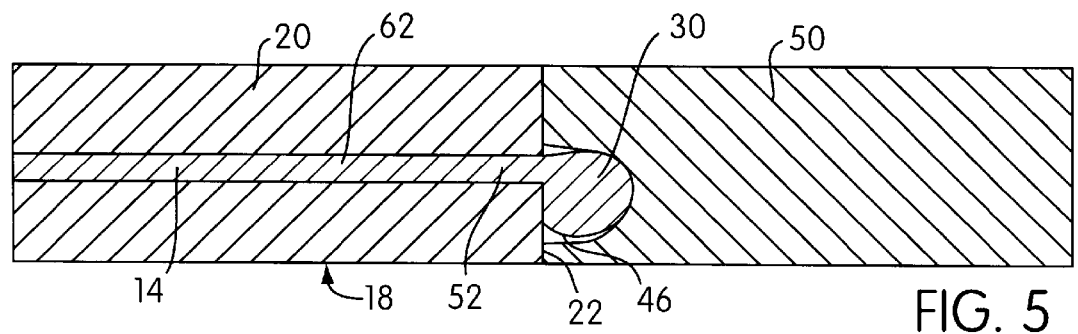
Figure 6:
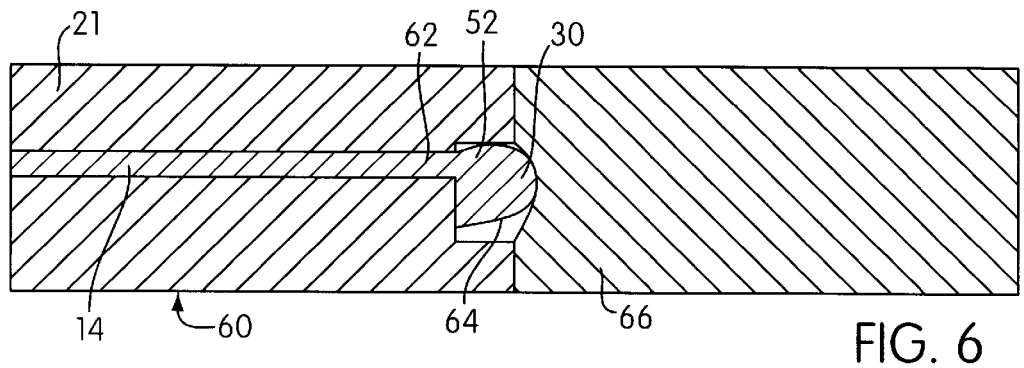
Figure 7:
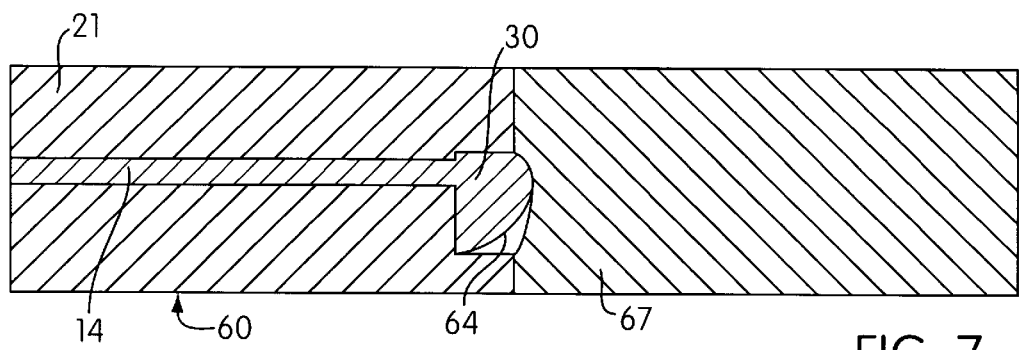
Figure 8:
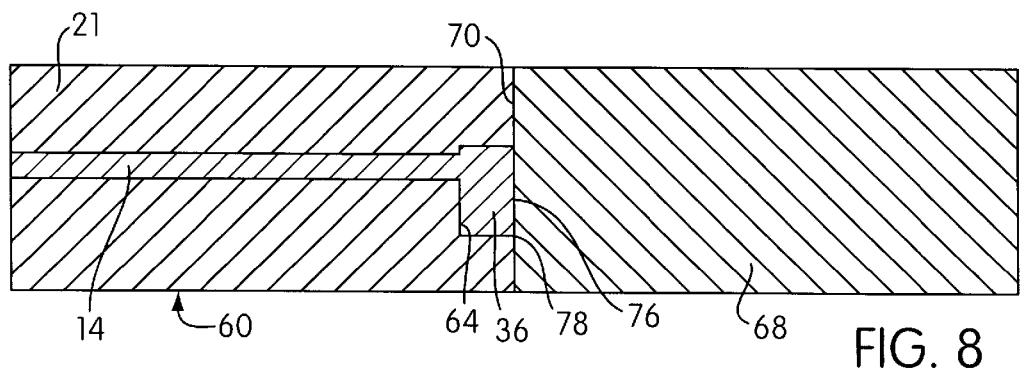
Figure 9:
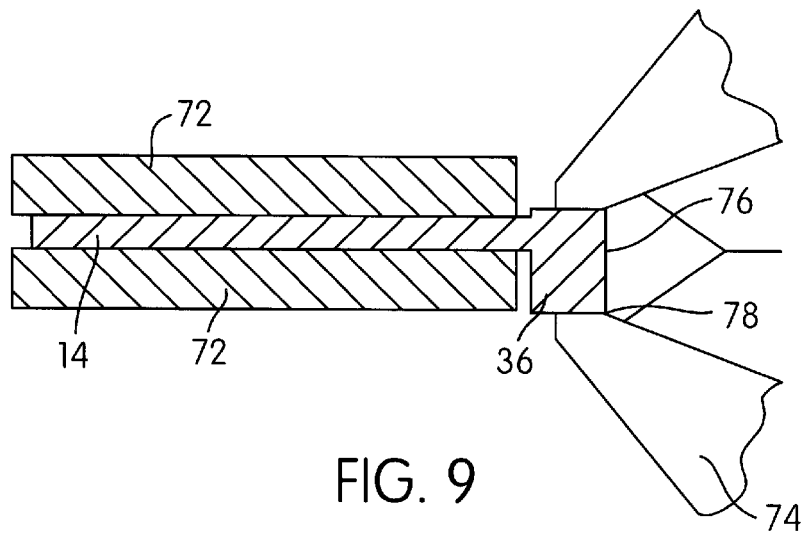
Figure 10:
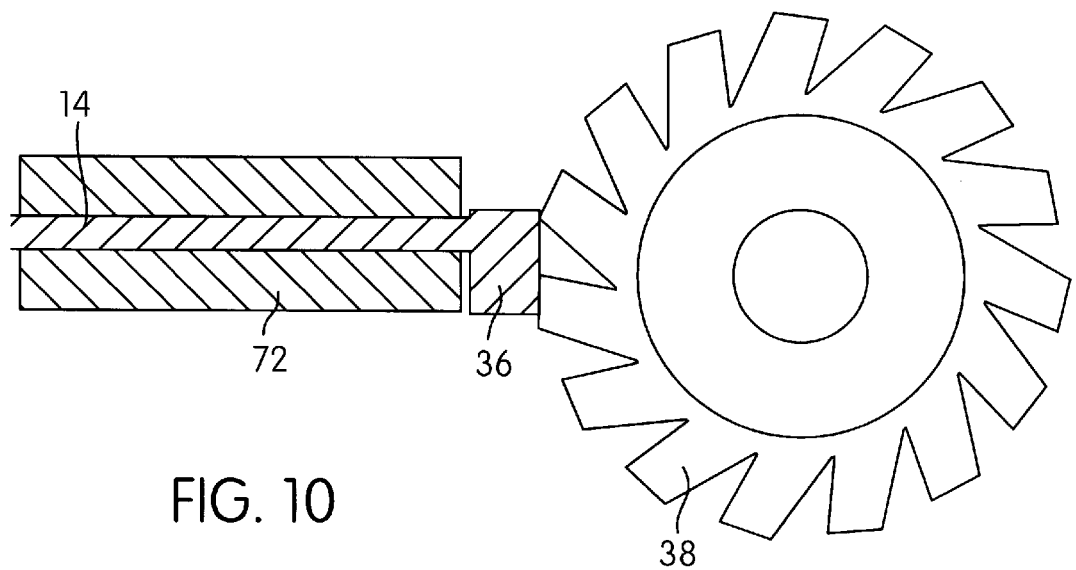
Figure 11:
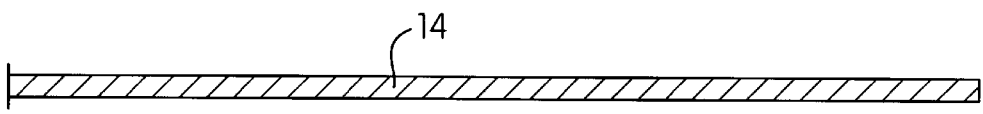
Figure 12:
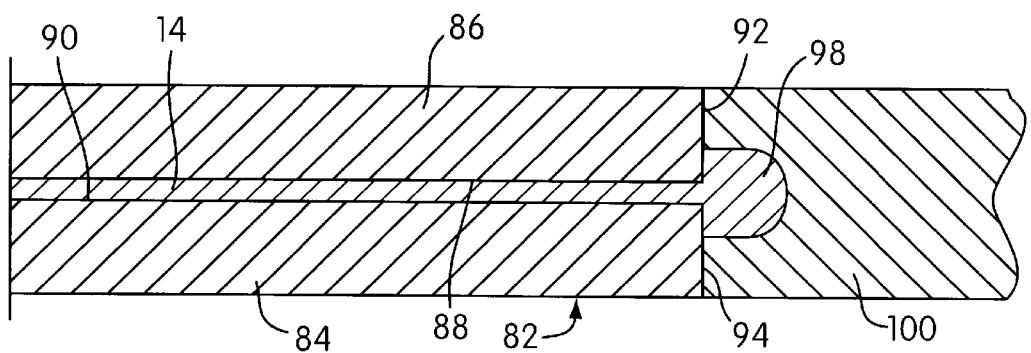
Figure 13:
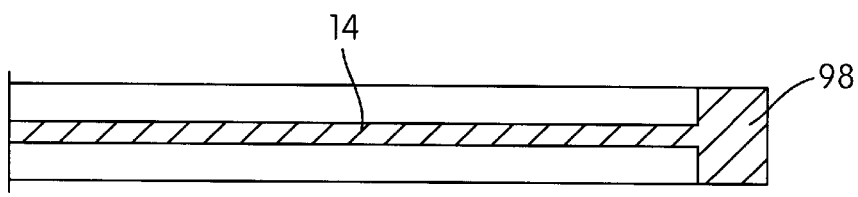
Figure 14:
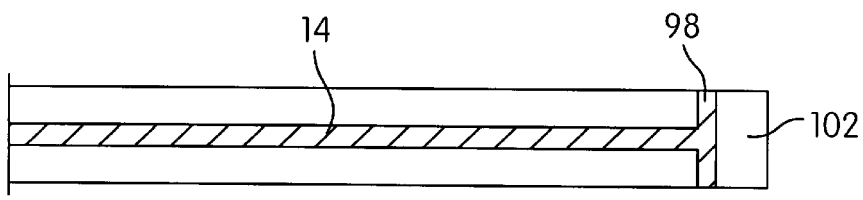

FIG. 3 is a fragmentary sectional view of one-half of the circular piece of sheet metal secured with in the rotary holding unit as in FIG. 2 and showing a fragmentary sectional view of a first thickening tool performing a first step in the preferred method of a cold forming process which progressively moves a predetermined marginal portion of the sheet metal radially inward and axially outward while maintaining the integrity of the cross-sectional outline in accordance with the method of the present invention;

FIG. 4 is a view similar to that shown in FIG. 3 showing slight radially inward advance and a pronounced asymmetric axial migration of a thicken predetermined marginal portion of the sheet metal effected by a second thickening tool;

FIG. 5 is a view similar to that shown in FIG. 4 showing the evolving marginal portion of the sheet metal in initial contact with a portion of the cylindrical exterior surface of the rotary holding unit which results from the cold forming action of a third thickening tool;

FIG. 6 is a fragmentary sectional view of the piece of sheet metal secured within a second rotary holding unit and showing a fourth thickening tool moving a portion of the peripheral mass of the metal axially and radially inwardly into a peripheral annular space formed by the second rotary holding unit which annular space asymmetrically surrounds an outer portion of the sheet metal and which progressively receives the same;

FIG. 7 is a view similar to FIG. 6 showing a fifth thickening tool moving the peripheral mass of the sheet metal farther into the peripheral annular space;

FIG. 8 is a view similar to FIG. 7 showing a sixth thickening tool forming a cylindrical exterior surface on the peripheral mass of the sheet metal;

FIG. 9 shows the cold formed periphery of the sheet metal being trimmed prior to hobbing;

FIG. 10 shows the cold formed periphery of the sheet metal being hobbed to form a plurality of teeth therein;

FIG. 11 is a fragmentary sectional view of one-half of a circular piece of sheet metal shown in isolation which constitutes the preferred starting material in practicing the principles of the present invention; and FIGS. 12, 13 and 14 are views similar to FIGS. 3 through 8 illustrating the steps in performing another embodiment of the method of the present invention.

Figure 1:
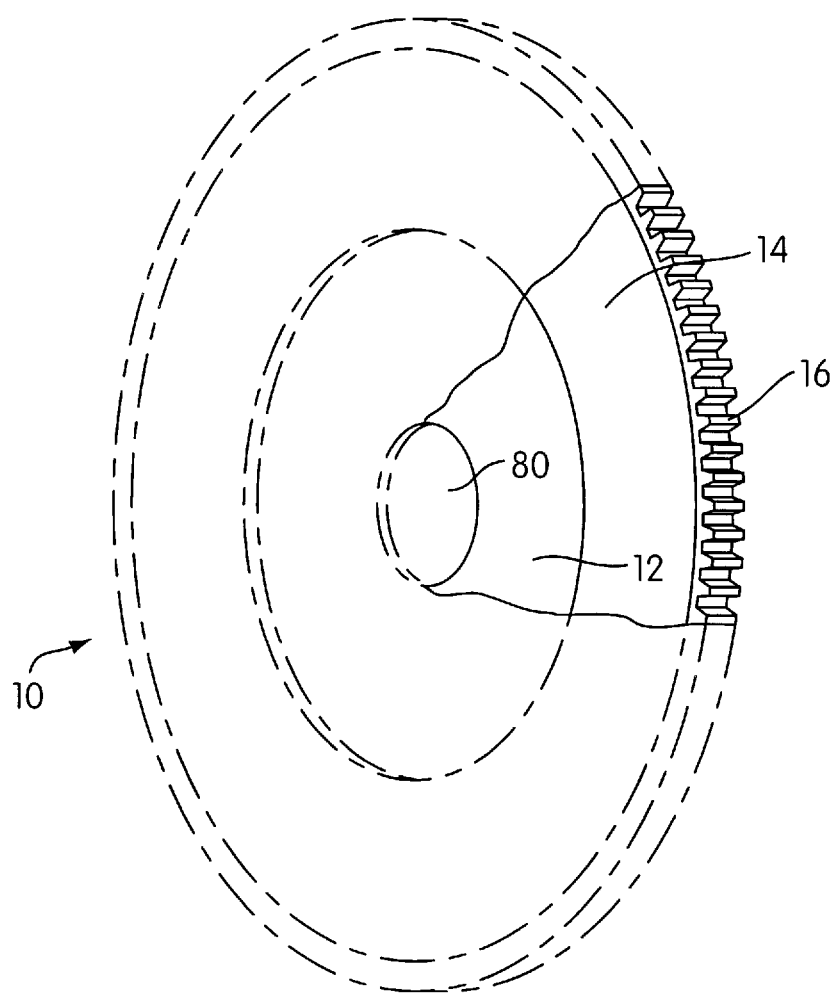
FIG. 1 is a perspective view partly in solid lines and partly in dotted lines of a starter gear constructed in accordance with the method of the present invention.

Referring now more particularly to FIGS. 1 through 10, there is shown therein a toothed wheel in FIG. 1 in the form of a starter gear, generally indicated at 10, constructed in accordance with the principles of the present invention. FIGS. 2 through 10 illustrate the sequence of steps in the preferred method of making the starter gear 10 in accordance with one embodiment of the method of the present invention. As shown, the starter gear 10 is made from a single circular piece of sheet metal 14 of uniform thickness, as, for example, preferably steel that is capable of being cold-formed. As best shown in FIG. 1, the starter gear 10 includes a central wall 12 of sheet metal having a thickness generally equal to the predetermined thickness of the sheet metal which forms the starting material. FIG. 11 illustrates in cross-section one-half of a circular piece of sheet metal 14 the formation of which constitutes a first step in the method of the present invention. The starter gear 10 also includes a thickened annular section formed integrally with the outer periphery of the central wall 12, a portion of which is cut, preferably by hobbing, to form a plurality of gear teeth 16 therein.

Referring now more particularly to FIGS. 2 and 11, the circular piece of sheet metal 14 is illustrated therein to be a separate piece which may be formed in a plurality of ways, including by being stamped from a continuous sheet of steel. It will be understood that the separation of the circular starting piece 14 from a roll or continuous web of sheet material need not be accomplished in a single step wherein the circular piece 14 is produced for subsequent handling but may be only transitionally formed as a part of a multi-step sequence in the method.

As shown in FIG. 2, the starting circular piece of sheet metal 14 of uniform thickness is secured within a first rotary holding unit, generally indicated by the reference numeral 18. The first rotary holding unit includes two identical rotary holding members 20 which are shown in fragmentary cross section in FIGS. 2 through 5. The two rotary holding members 20 are smaller in diameter than the starting circular piece of sheet metal 14, sometimes also referred to as a "blank", and each rotary holding member 20 defines a radially outwardly facing smooth cylindrical surface 22 symmetrically positioned on either side of the blank. The first rotary holding unit 18 is used to secure and rotate the sheet metal work piece 14 with respect to a series of separate rotating cold forming members or tools in the first three steps of the cold forming process. At least one of the cylindrical surfaces 22 of the first rotary holding unit 18 cooperates with a cold forming member to shape the work piece into an interim configuration during the cold forming process. When the blank 14 is placed between the rotary holding members 20, an outer annular portion 24 thereof extends symmetrically radially outwardly therefrom. The outwardly extending portion 24 of the circular piece of sheet metal 14 defines an essentially planar ring with a cylindrical outer edge 26 prior to the commencement of cold forming. This structure is shown in fragmentary cross section in FIG. 2. The blank 14 is held between the rotary holding members 20 by an inner pair of central wall engaging surfaces 28 formed on each rotary holding member 20.

The sheet metal 14, sometimes referred to herein as a work piece 14, is cold formed by a plurality of separate thickening tools to gradually thicken the outer peripheral edge thereof and direct the same axially, preferably in predominantly one axial direction, to form a rim or a flange with respect to the noncold-formed portion of the sheet metal 14. In the preferred embodiment, three thickening tools cold form the sheet metal in succession while the sheet metal 14 is secured within the first rotary holding unit 18. These three thickening tools are each used in a separate step in the process and are shown in FIGS. 3 through 5 and act to gradually move the outer peripheral edge 30 of the sheet metal 14 radially inwardly and axially, preferably predominantly in one axial direction, although axially symmetric cold forming, axially asymmetric cold forming in both axial directions and axial cold forming in one axial direction are within the scope of the invention. In the preferred method, the cold forming is performed axially asymmetrically in both axial directions.

The cold forming continues as shown in FIGS. 6, 7 and 8 after placing the sheet metal 14 in a second rotary holding unit 60 and cold forming it with a fourth, a fifth and a sixth thickening tool in three successive steps. The final cold formed product 14 is placed in a stationary holding assembly 72 where it is trimmed by a trimming device 74 and finally a plurality of teeth 16 are cut in the cold formed portion 36 of the sheet metal 14, preferably by hobbing using a hobbing device 38 in a manner well known in the art. Broaching can also be used to cut the teeth.

More specifically, the cold forming process begins by rotating the blank 14 and moving the first thickening tool 40 into engagement therewith. The first thickening tool 40, as all of the subsequent thickening tools, is rotated about an axis which is parallel to the axis of rotation of the sheet metal 14 and the rotational speeds of each thickening tool and the work piece 14 are synchronized. The first thickening tool 40 defines a deep smooth annular recess 42 with shaped side walls 44, seen in cross-section in FIG. 3. This first step essentially shortens and widens the peripheral edge 30 of the work piece 14. It is important that the preferred method form an increasingly thicker mass 30 on the peripheral edge of the work piece 14 such that the exterior surface 46 of the mass 30 changes shape to form a thickened portion without ever folding back on itself. If two portions of the exterior surface 46 of the axially and radially inwardly migrating mass 30 come in contact with each other, a seam or fissure could result that would make the resulting cold formed peripheral rim or flange 36 an unsuitable starting structure for defining a plurality of teeth 16 therein by cutting using any method, including hobbing or broaching. Hence, it can be seen that the thickening 30 in FIG. 3 is essentially radially inward causing the sides of the work piece 14 to slightly bulge axially outwardly in both axial directions.

The effect of the second thickening tool 48 is illustrated in FIG. 4 which shows the migrating peripheral mass 30 to be thicker and shows asymmetric axial movement toward one of the rotary holding members 20 to have begun. The second thickening tool 48 defines an annular working surface with a U-shaped cross-section which is wider and less radially extensive than that of the first thickening tool 40. The third thickening tool 50 shown in FIG. 5 cold forms the thickening periphery 30 so that it contacts and partially flattens against preferably one outwardly facing cylindrical surface 22 of one of the rotary holding members 20 of the rotary holding unit 18. As can be seen in FIGS. 3 through 5, the first rotary holding members 20 hold the work piece 14 so that a first inner annular portion 52 of the work piece 14 is held therebetween and a first outer marginal portion 54 of the blank 14 is cold formed until the first outer marginal portion 54 forms an axially thickened shape having an outer peripheral dimension greater than the outer peripheral dimension of the final thickened rim or flange and an inner peripheral dimension greater than the inner peripheral dimension of the thickened rim to be formed by the subsequent cold forming steps shown in FIGS. 4 through 6. In this interim configuration, the work piece 14 has been cold formed until the three thickening tools 40, 48 and 50 have forced the mass 30 so that it is partially flattened against the side surface 22 of the rotary holding member 20 thereby axially thickening the rim to form the axially thickened interim configuration shown in FIG. 5. The next step in the process is to place the work piece 14 in a second rotary holding unit 60 so that the work piece 14 is restrained at a second inner annular portion 62 which is spaced radially inwardly from the first annular portion 52 such that the first annular portion 52 of the work piece 14, which was gripped between the holding members 20 in the first three thickening steps shown in FIGS. 3 through 5, is now no longer between the holding members 21 of the second rotary holding unit 60 and therefore can be cold formed by the fourth thickening tool 66, the fifth thickening tool 67 and the sixth thickening tool 68. The second rotary holding unit 60 defines a recess 64 adjacent the first annular portion 52 of the work piece 14 which progressively receives the migrating mass 30 as the outer periphery of the work piece 14 is cold formed by the successive thickening tools 66, 67 and 68. As these three thickening tools 66, 67 and 68 cold form the rim, the first annular portion 52 becomes part of the mass 30 as the cross sectional outline of the mass 30 is progressively moved radially inwardly and axially outwardly by the thickening tools 66, 67 and 68. The thickening tools 66, 67 and 68 maintain the integral integrity of the metal within the cross-sectional outline without merging portions of the cross-sectional outline together as the mass 30 is enlarged to incorporate the first annular portion 52 therein.

Therefore, before the fourth thickening tool 66 is applied to the work piece 14, the work piece 14 is placed in a second rotary holding unit 60 which defines an annular space to receive the mass 30 formed on the outer periphery of the work piece 14. The fourth and fifth thickening tools urge the mass into the annular space 64 while maintaining the exterior surface 46 of the mass 30 as a smooth continuous surface. The sixth thickening tool 68 defines an essentially cylindrical exterior surface 70 as shown in FIG. 8. The sixth thickening tool 68 and the annular space 64 cooperate to form the essentially cylindrical rim or flange 36 of uniform generally rectangular cross-section on the periphery of the work piece 14 as shown in FIG. 8. It can be seen that by utilizing the six successive tools 40, 48, 50, 66, 67 and 68 and the first and second rotary holding units 18 and 60, a marginal peripheral portion of the blank 14 has its cross sectional outline progressively moved radially inwardly and axially outwardly while the integral integrity of the metal within the cross-sectional outline is maintained without merging portions of the cross-sectional outline together. The predetermined marginal portion of the metal blank 14 which is cold formed contains an amount of metal sufficient to form a thickened annular rim of uniform generally rectangular cross-sectional configuration. The final dimensions of the rim 36 are important because the teeth of the final toothed wheel 10 will be cut therein, by hobbing. Therefore it is desirable that the outer periphery of the thickened rim 36 which has been cold formed by the six thickening tools from the provided circular, uniformly thick sheet metal blank 14 has (1) an outer periphery that does not exceed the outer periphery of the toothed wheel 10 to be formed by more than approximately 2% (two per cent), (2) a radial thickness which is at least 2.0 mm (two millimeters) greater than the tooth height of the toothed wheel 10 to be formed and (3) an axial thickness at least two times the thickness of the blank 14. A specific example of the thickened rim 36 has an outer periphery which does not exceed the outer periphery of the toothed wheel to be formed by more than approximately one percent, a radial thickness at least 2.5 mm greater than the tooth height of the toothed wheel to be formed and an axial thickness at least 4 times the uniform thickness of said blank.

When topless hobbing is used to cut the teeth in the uniform cold formed thickened rim, the periphery of the thickened rim, that is the peripheral dimension of the cold formed rim, could be equal to the periphery of the toothed wheel to be formed. When hobbing is used to define the teeth in the rim, the plurality of cuts made by the hobbing operation that form the crests of the series of teeth define the peripheral size of the toothed wheel 10. The sides of the thickened rim 36 can be trimmed by removing material from the rim 36 before the hobbing operation is performed. A rim thus dimensioned can be hobbed to form a series of teeth because the integral integrity of the cold formed metal which forms the rim 36 has been maintained by the cooperation of the six thickening tools 40, 48, 50, 66, 67 and 63 and the two holding units 18 and 60. In the preferred embodiment, the annular space 64 which is used to effect these dimensions is defined by the cooperation of both of the holding members 21 in the second rotary holding unit 60 so that the rim 36 extends axially on both sides of the annular planar portion 62 as seen in FIGS. 9 and 10. It is within the scope of the present invention to provide a second rotary holding unit 60 which defines an annular space 64 in only one of the second rotary holding members to receive an advancing cold formed mass in only one axial direction.

The work piece 14 is next placed within the stationary holding structure 72 and is trimmed by the trimming tool 74 as shown in FIG. 10. The trimming tool 74 preferably trims the outwardly facing cylindrical surface 76 of the peripheral rim 36, although the edges of the rim 78 and the portions of the work piece 14 on each side of the rim 36 may be trimmed as well. The trimming step will vary depending on the method used to cut the plurality of teeth 16 in the rim or flange 36. After trimming is completed, the peripheral rim 36 is cut to define a plurality of troughs or, alternatively, a plurality of crests and troughs to form a plurality of teeth 16 thereon. Hobbing is the preferred method of cutting the teeth 16 and either, topless hobbing, which is preferred, or regular hobbing can be used. The hobbing steps are preferably performed by a Hurth Modul hobbing machine Model Number WF300. Topless hobbing procedure cuts only the troughs in the peripheral rim of the work 14 piece while regular hobbing cuts both crests and troughs therein.

Once a plurality of teeth 16 are cut in the rim 36, it may be desirable to harden the teeth 16, depending on the use to which the toothed wheel structure 10 will be put. In the case of the starter gear 10 made in accordance with the above procedure, it is desirable that the final configuration be given a heat treatment at least in the area of the series of teeth 16. Preferably, the heat treatment is by induction heating to a temperature of 850° to 900° C. followed by quenching in water to lower the temperature of the heat treated portion to about room temperature. Heat treatment is considered desirable in the case of a starting gear because of the severe loads which are imposed along the volute surfaces of the teeth in operation. In forming other toothed wheels, such as timing belt pulleys and pulse rings, the provision of an integral pulse ring with the series of teeth may be eliminated and the heat treatments can likewise be eliminated. Also, as best shown in FIG. 1, the central wall 12 is centrally apertured, as indicated at 80, which is a cold-forming step that may be accomplished after the series of teeth 16 are machined in or preferably this opening is formed prior thereto.

Referring now to FIGS. 11 through 14, there is shown therein another modification within the principles of the present invention. Here again, FIG. 11 illustrates a starting circular piece of steel sheet metal 14. The circular piece 14 is secured with a rotary holding unit 82 which is similar to the unit 18 previously described. The unit 82 includes two rotary holding members 84 and 86. The holding members 84 and 86 when in operative relation with the work piece 14 include an inner pair of central wall engaging surfaces 88 and 90 extending to a pair of exterior peripheral surfaces 92 and 94.

The circular work piece 14 is secured in operative relation between the holding members 84 and 86 so as to extend generally axially outwardly from the plane of the peripheral surfaces 92 and 94 beyond the outer periphery of a central portion of the circular piece 14 which constitutes a central wall 86. The annulus of the circular piece 14 is thickened into a solid annular section 98 by utilizing a thickening tool 90.

By advancing the rotary thickening tool 100 in conjunction with the rotation of the rotary holding unit 82, the outer annulus of the circular piece 14 is thickened into the solid annular section 98 having a width equal to or slightly greater than the width of the teeth to be formed and a height or radial extent which is greater than the height of the teeth to be formed.

FIG. 13 illustrates a variation in accordance with the present invention wherein the periphery and sides of the thickened portion 98 are machined prior to the step of machining a series of teeth 102 in the thickened portion 98, as shown in FIG. 14. Premachining the sides may be particularly desirable where the hobbing step or broaching step is preformed on a multiplicity of preforms mounted in side-by-side relation rather than on each perform separately.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method for forming a toothed wheel which comprises the steps of:
   providing a circular sheet metal blank of uniform thickness,
   cold forming an outer peripheral portion thereof into a thickened rim of uniform generally rectangular cross-sectioned configuration having (1) an outer periphery which does not exceed the outer periphery of the toothed wheel to be formed by more than approximately two percent (2) a radial thickness at least 2.0 mm greater than the tooth height of the toothed wheel to be formed, and (3) an axial thickness at least twice the uniform thickness of said blank,
   said cold forming comprising progressively moving a predetermined marginal peripheral portion of the metal blank having a cross sectional outline radially inwardly and axially outwardly while the integral integrity of the metal within the cross sectional outline is maintained without merging portions of the cross sectional outline together, and
   cutting a series of teeth in the periphery of the thickened rim by a hobbing operation.

2. A method for forming a toothed wheel as claimed in claim 1, wherein the cold forming of the thickened rim further comprises progressively forcing the periphery of a first outer marginal portion generally radially inwardly while restraining said blank along a first inner annular portion defining said first outer marginal portion to form an interim axially thickened shape having an outer peripheral dimension greater than the outer peripheral dimension of the final thickened rim and an inner peripheral dimension greater than the inner peripheral dimension of the thickened rim and thereafter progressively forcing the periphery of the interim axially thickened shape generally radially inwardly while restraining said blank along a second inner annualar portion spaced radially inwardly from said first inner annular portion to form said thickened rim.

3. A method for forming a toothed wheel as claimed in claim 2, wherein the progressive forcing of the first outer marginal portion is accomplished by applying forces by three successive rigid surfaces of different configuration.

4. A method for forming a toothed wheel as claimed in claim 3, wherein the progressive forcing of the interim shape is accomplished by applying three successive rigid surfaces of different configuration.

5. A method for forming a toothed wheel as claimed in claim 2, wherein the progressive forcing of the interim shape is accomplished by applying three successive rigid surfaces of different configuration.

6. A method for forming a toothed wheel as claimed in claim 1, wherein the outer periphery of the thickened rim does not exceed the outer periphery of the toothed wheel to be formed by more than 1%.

7. A method for forming a toothed wheel as claimed in claim 6, wherein the radial thickness of the thickened rim is at least 2.5 mm greater than the tooth height of the toothed wheel to be formed.

8. A method for forming a toothed wheel as claimed in claim 7, wherein the axial thickness of the thickened rim is at least 4 times the uniform thickness of said blank.

9. A method for forming a toothed wheel as claimed in claim 1, wherein the radial thickness of the thickened rim is at least 2.5 mm greater than the tooth height of the toothed wheel to be formed.

10. A method for forming a toothed wheel as claimed in claim 9, wherein the axial thickness of the thickened rim is at least 4 times the uniform thickness of said blank.

11. A method for forming a toothed wheel as claimed in claim 1, wherein the axial thickness of the thickened rim is at least 4 times the uniform thickness of said blank.

12. A method of forming a toothed wheel as claimed in claim 1, wherein the periphery of said thickened rim is equal to the periphery of the toothed wheel to be formed and said hobbing operation is a topless hobbing operation.

13. A method for forming a toothed wheel as claimed in claim 1, wherein said hobbing operation forms the crests of the series of teeth defining the peripheral size of the toothed wheel.

14. A method for forming a toothed wheel as claimed in claim 1, wherein t he sides of the thickened rim are trimmed by removing material therefrom prior to the hobbing operation.

* * * * *